US007818882B2

(12) United States Patent
Fitz et al.

(10) Patent No.: US 7,818,882 B2
(45) Date of Patent: Oct. 26, 2010

(54) METHOD OF MAKING A ONE-WAY DRIVE DEVICE

(75) Inventors: Frank A. Fitz, Poway, CA (US); Wayne K. Higashi, Los Gatos, CA (US)

(73) Assignee: EPX, L.P., Los Gatos, CA (US)

( * ) Notice: Subject to any disclaimer, the term of this patent is extended or adjusted under 35 U.S.C. 154(b) by 672 days.

(21) Appl. No.: 11/844,757

(22) Filed: Aug. 24, 2007

(65) Prior Publication Data

US 2009/0050436 A1   Feb. 26, 2009

(51) Int. Cl.
*B21D 53/28* (2006.01)
(52) U.S. Cl. ............... 29/893.1; 29/893; 29/893.3; 192/41 R; 192/46
(58) Field of Classification Search ............ 29/893, 29/893.1, 893.3, 437, 434; 192/41 R, 46, 192/45.2
See application file for complete search history.

(56) References Cited

U.S. PATENT DOCUMENTS

| 5,070,978 | A | 12/1991 | Pires |
| 5,918,715 | A * | 7/1999 | Ruth et al. ............ 192/46 |
| 6,193,038 | B1 | 2/2001 | Scott et al. |
| 6,244,965 | B1 * | 6/2001 | Klecker et al. ......... 464/81 |
| 6,615,965 | B2 * | 9/2003 | Fitz et al. ............ 192/46 |
| 2002/0170796 | A1 | 11/2002 | Fitz |
| 2003/0006118 | A1 | 1/2003 | Masegi |
| 2006/0278488 | A1 | 12/2006 | Pawley |

* cited by examiner

*Primary Examiner*—David P Bryant
*Assistant Examiner*—Ryan J Walters
(74) *Attorney, Agent, or Firm*—Barry N. Young

(57) ABSTRACT

A one-way drive device is disclosed herein and includes a pocket plate assembly having a disc-shaped pocket plate and a notch plate assembly having a disc-shaped notch plate. The device also includes an axially extending, open-ended cylindrical shell for containing therein the pocket and notch assemblies. This shell includes opposite first and second axial ends and opposing inner and outer circumferential surfaces which extend axially between the end and which together are configured to include splines and first and second sets of tabs. The splines are circumferentially spaced from one another and extend axially across the shell body and they project radially inward and outward such that there innermost surface edges of the splines together define an innermost annular bearing surface. The first set of tabs is located adjacent to the first axial end of the shell and extend radially inward beyond the innermost annular bearing surface and the set of tabs is located adjacent to the second axial end of the shell and also extend radially inward beyond the innermost annular bearing surface. The tabs are configured to allow the pocket and notch plate assemblies to be easily assembled within the shell and they lock everything with in the shell in place.

7 Claims, 2 Drawing Sheets

METHOD OF MAKING A ONE-WAY DRIVE DEVICE

FIELD OF THE INVENTION

The present invention relates generally to one-way drive devices and more particularly to improvements in planar type one way drive devices and the way they are manufactured.

BACKGROUND OF THE INVENTION

Planer type one-way drive devices are well known in the art. In particular, attention is directed to a planer type one-way drive device described in U.S. Pat. No. 5,070,978 (Pires), which is incorporated herein by reference. This patent is owned by the assignee of the present application and is under license to another company which manufactures and sells one-way drive devices using the principles described in the '978 patent.

Briefly summarizing the one-way drive device disclosed in the '978 patent, it is shown including what the patent refers to as a strut plate and a receptor plate positioned in confronting relationship to one another. The corresponding plates disclosed herein are referred to as pocket and notch plates, respectively. The strut plate in this prior art patent includes a series of circumferentially spaced pockets, each of which receives a biasing spring and a strut movable within the pocket between the spring biased position extending partially outside the pocket and a forced position located entirely within the pocket, as described in the patent. The receptor plate also includes a series of circumferentially spaced pockets which serve to engage the struts under specific conditions of operation of the one-way drive device, as described in the patent. In the present application, the corresponding pockets are referred to as notches rather than pockets. For additional structural and functional details, reference is made to the '978 patent.

An actual commercial embodiment presently being manufactured and sold by the licensee mentioned above includes an integrally molded pocket plate having an outwardly projecting, circumferential side wall designed to define a chamber, more or less, for receiving an integrally molded notch plate. As will be seen hereinafter, the one-way drive device disclosed and claimed herein provides for an improved device, both structurally and the way in which it is manufactured and assembled.

SUMMARY

As will be described in detail hereinafter, the present specification describes a one-way drive device including a pocket plate assembly having a disc-shaped pocket plate and a notch plate assembly having a disc-shaped notch plate. In addition, this device includes an axially extending open-ended cylindrical shell for containing therein the pocket and notch plate assemblies. The shell has opposite first and second opened axial ends and opposing inner and outer circumferential surfaces which extend axially between the first and second ends and which together are configured to include (i) a plurality of circumferentially spaced and axially extending radially inward and outward projecting shell splines, (ii) a first set of tabs, and (iii) a second set of tabs. The radially inward and outward projecting shell splines are configured to have radially innermost surface edges (the innermost tips of the splines), which together define an innermost annular bearing surface of the shell. At the same time, the first and second sets of tabs, located adjacent to the first and second axial ends of the shell, respectively, extend radially inward beyond the innermost annular bearing surface.

In a specifically illustrated embodiment, the shell splines extend axially from the first end of the shell to the second end of the shell, except where the first and second sets of tabs are located. In this same embodiment, the shell is formed from a single elongated sheet of metal having end edges. This single sheet is rolled into a cylinder with its lengthwise edges fixedly connected together. Alternately, the spline shell may be formed by plastically extruding the shape from molten or otherwise made plastic metal and subsequently slicing the extrusion into parts with the appropriate axial length. In this same embodiment, the shell spline and tabs are integrally formed from the single sheet of metal and, in particular, each of the tabs is stamped or otherwise deformed radially inward from a segment of an associated one of the shell splines.

Still referring to the specification, the embodiment just discussed is made in the following manner: The cylindrical shell including its splines is first made. Thereafter, the first set of tabs is formed adjacent to a first axial end of the shell, after which the pocket plate assembly and the notch plate assembly are introduced into the shell such that one of those plate assemblies actually interlocks in a splined fashion with the shell while the other assembly is radially located by the inner surfaces of the spline shell. This assembly then interlocks with the first assembly by means of the struts so as to serve as a one-way drive device. Thereafter, a disc-shaped washer is provided and interlocked in a spline with the shell and is axially retained by the second set of tabs to lock the assemblies in place.

Further details of the improved one-way drive device and the way in which it is made and assembled will follow from the detailed description in conjunction with the drawings.

DETAILED DESCRIPTION

Figure 1:
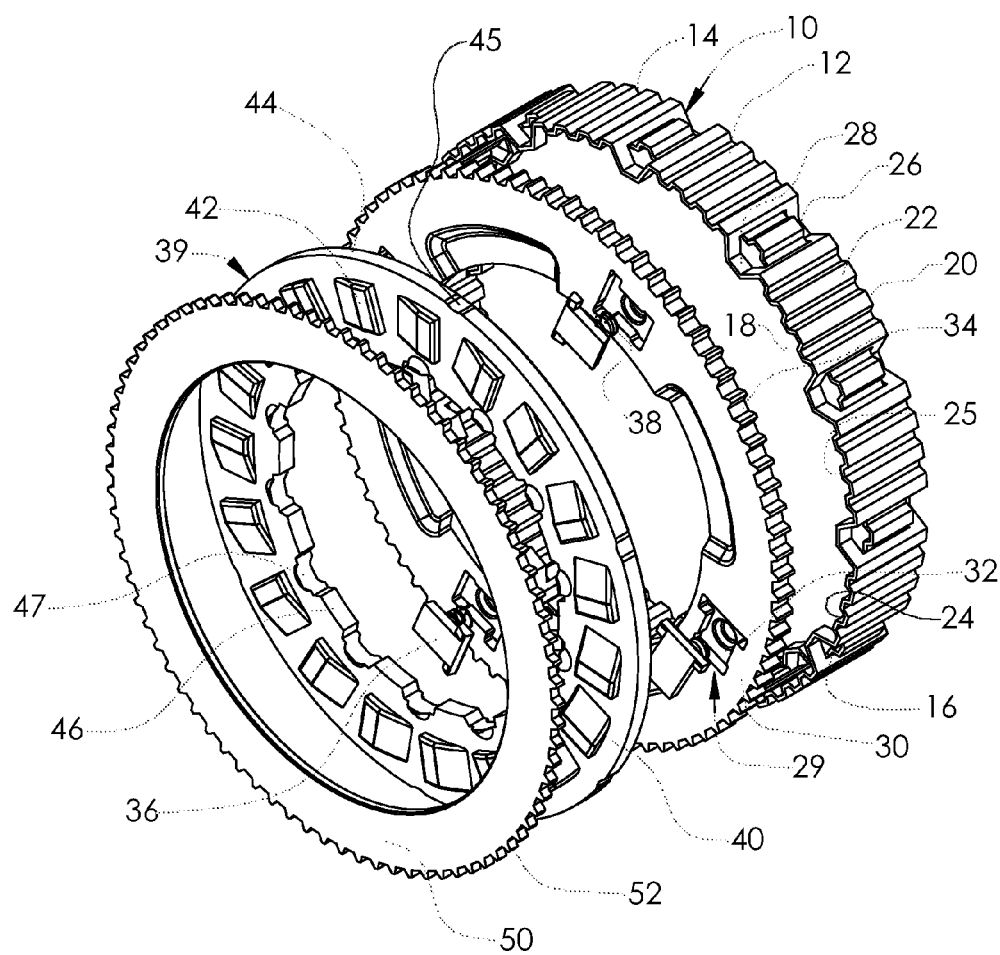
FIG. 1 is an exploded perspective view of a one-way drive device designed in accordance with the present disclosure.

Turning now to the drawings wherein like components are designated by like reference numerals in the two figures, attention is first directed to FIG. 1 which illustrates a one-way drive device generally indicated by the reference number 10. This one-way drive device includes an axially extending, open-ended cylindrical shell 12 having opposite first and second open ends 14 and 16 and opposing inner and outer circumferential surfaces 18 and 20 that extend axially between the ends 14 and 16. The opposing inner and outer circumferential surfaces together are configured to provide, in the first instance, a plurality of circumferentially spaced and axially extending, radially inward and outward projecting shell splines 22 having radially innermost surface edges 24, which together define an innermost annular bearing surface 25 generally indicated in FIG. 2.

Figure 2:
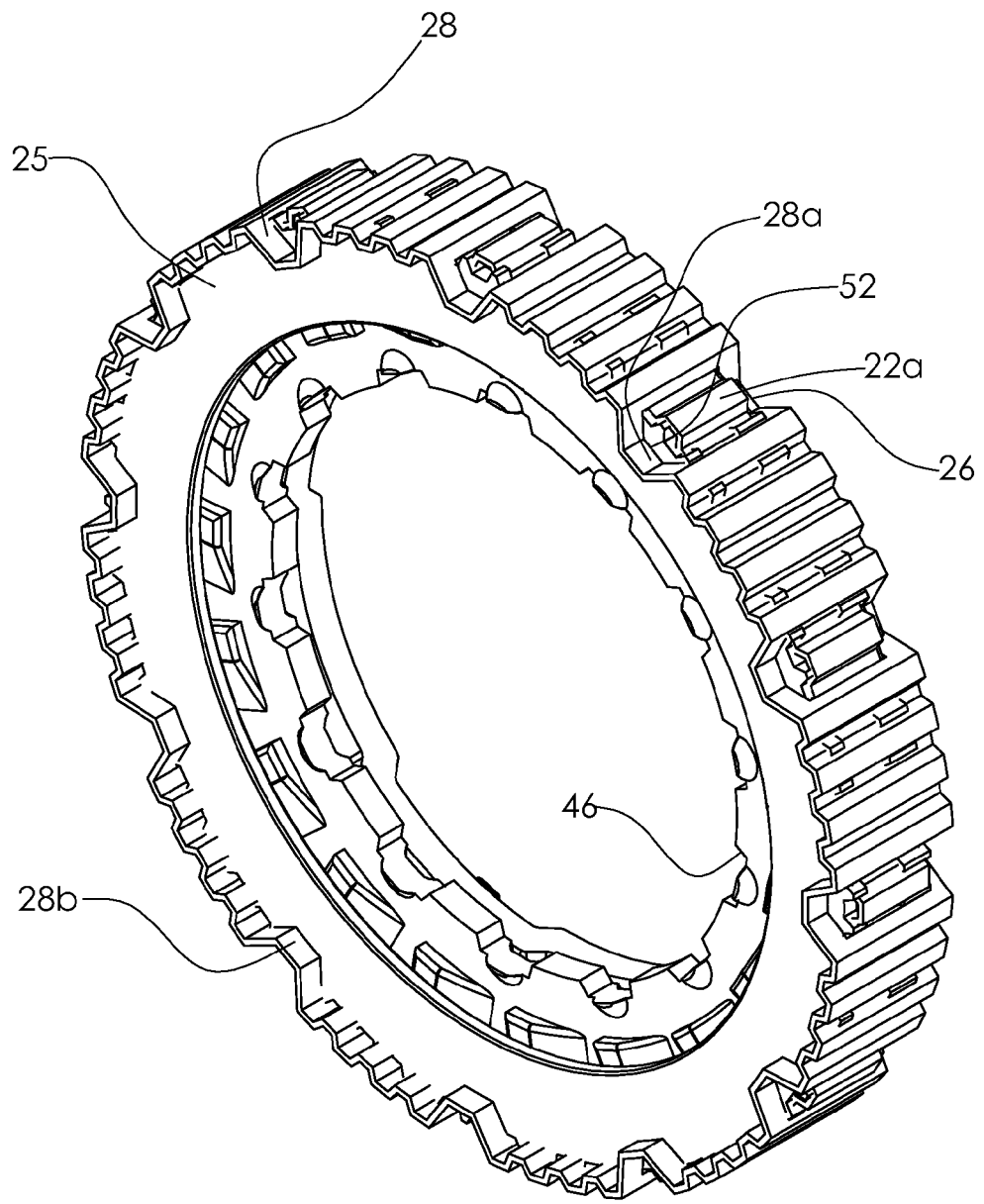
FIG. 2 is a perspective view of the device showed in FIG. 1; however, in an assembled state.

Still referring to FIG. 1 and shell 12, the latter is also shown including a first set of tabs 26 located adjacent to the first axial end 14 of the shell. These first tabs extend radially inward beyond the innermost annular bearing surface 25 for the reasons to be described hereinafter. The shell also includes a second set of tabs 28 located adjacent to the second axial end of the shell and, like the first tabs, the second tabs extend radially inward beyond the innermost annular bearing surface 25, again for the reasons to be explained hereinafter, as best seen in FIG. 2. As illustrated in both FIGS. 1 and 2, the tabs of each set are circumferentially spaced around the shell. While approximately twelve such tabs are shown at each end of the shell, it will become apparent hereinafter that there could be a greater or lesser number so long as the tabs function in the intended manner. Moreover, the way in which this shell assembly (that is, the shell including its splines and tabs) is made in accordance with one embodiment will be described hereinafter.

Still referring to FIG. 1, in addition to shell 12, the one-way drive device 10 includes a pocket plate assembly 29 including a disc-shaped pocket plate 30 disposed within shell 12 between the first and second sets of tabs 26 and 28, respectively. This disc-shaped pocket plate has opposing planar sides including a series of circumferentially spaced pockets 32 and an outermost circumferential periphery defining circumferentially spaced splines 34. These splines 34 are interlocked for rotation with cooperating ones of the shell splines 22 at a circumferential location adjacent to the first set of tabs 26. Within each pocket 32 in pocket plate 30, the pocket plate assembly 29 includes a strut 36 and cooperating biasing member 38, specifically a spring in this embodiment, such that the strut is moveable within its pocket between a biased driving position and an overrun position to be described below. The whole assembly 10 connects with a first external rotating element by means of the spline 22 which is the outer surface of the spline shell 12. The assembly 10 also connects with a second external rotating element by means of the inner spline surface of a pocket plate to be described.

In the embodiment illustrated in FIGS. 1 and 2, the pocket plate assembly 29 is positioned within the shell 12 such that its pocket plate rests up against the set of tabs 26 which extend sufficiently radially inward to prevent the pocket plate from moving out of the shell in the direction of those tabs. At the same time, as indicated previously, the splines 34 interlock with the splines 20 of the shell so that the shell and pocket plate rotate as a single unit.

Still referring to FIG. 1, one-way drive device 10 is shown also having a notch plate assembly 39 which is comprised of notch plate 40. Notch plate 40 is also disc-shaped and includes opposing planer sides having a series of circumferentially spaced notches 42. Each of these notches is configured to engage, periodically, one of the struts 36 when the latter is in its biased driving position and the pocket and notch plates rotate in predetermined directions relative to one another, as will be discussed hereinafter and as is well know with regard to planar type one-way drive devices. The notch plate defines an outermost circumferential periphery 44 that serves as an outermost annular bearing surface. To that end, the notch plate is dimensioned such that its outermost circumferential periphery 44 is located ever so slightly radially inward of and in confronting relationship with the innermost annular bearing surface 25 of shell 12 when the notch plate is properly assembled within the shell in the manner to be described below. In this regard, a number of circumferentially spaced channels or passageways 45 are provided within the periphery 44 of the notch plate to accommodate the passage of oil within the device The notch plate also includes an innermost circumferential periphery 46 including appropriately configured splines 47 designed to interlock with an external drive or driven member (not shown).

Once the pocket plate assembly 39 is located within Shell 12 with pocket plate 30 up against tabs 26, notch plate assembly is positioned within the shell with its notch plate up against the pocket plate such that the spring biased struts 36 carried by the pocket plate and the notches 42 carried by the notch plate cooperate with one another in the typical one-way drive operation to be described briefly below and described in detail in the '978 patent discussed previously. To this end, keep in mind that the notch plate is mounted for rotation about an axis (the axis of the drive or driven member to which it is adapted to be attached) which is co-extensive with the axes of the shell and pocket plate.

In addition to the shell 12 including its splines and tabs, the pocket plate assembly 29 and the notch plate assembly 39, the overall one-way drive device 10 includes an oil controlling end washer 50 including a splined outer periphery 52 configured and dimensioned to interlock with splines 22 of shell 12. In particular, once the pocket plate assembly and the notch plate assembly are assembled in place within the shell 12 in the manner described above, that is, after the tabs 26 are formed in the manner to be described but before the tabs 28 are formed, the washer 50 is located within the shell up against the side of notch plate 40 opposite pocket plate 30. Once the washer 50 is so positioned, the tabs 28 are provided in the manner to be described, thereby locking the washer inside the shell by virtue of the fact that they extend radially inward beyond the outermost periphery of the washer. Indeed, the tabs 26 on one side of the shell and the tabs 28 on the other lock the notch plate assembly, the pocket plate assembly, and the washer together in a sandwiched configuration such that the pocket plate and the washer rotate with the shell as a single unit while the notch plate is free to rotate in the manner to be described.

Before describing the way in which one-way drive device 10 operates, attention is directed to the way in which it is made and assembled in accordance with one particular embodiment disclosed herein. Let us start with the shell itself, which begins as a thin strip of metal material, for example, low carbon steel sheet material having a thickness of approximately 0.040 inches (approximately 1 millimeter). The length of this sheet material and its width will be dictated by the intended diameter of the ultimately formed shell and its axial length. For example, in one embodiment of device 10, the inner diameter of the shell, that is, the diameter of its radially inwardly facing bearing surface 24, is 5.51 inches (approximately 140 millimeters) and the axial length of the shell is 0.880 inches (approximately 22 millimeters). These various dimensions are being provided and indeed the material itself making up the shell are provided for exemplary purposes only and are not intended to limit the claims appended hereto. In view of the teachings herein and the desired application is established, one with ordinary skill in the art can readily provide the necessary material and the dimensions.

Once the sheet material for making the shell is provided, either the splines 22 and tabs 26 and 28 are provided in it, and then it is rolled into a shell or it can be rolled into the shell first with the splines and tabs being provided thereafter. Indeed, the splines can be provided first before the sheet material is formed into the shell 12 and then the tabs provided thereafter. In any of these cases, once the sheet material is rolled into a shell, it is welded, crimped or otherwise connected at its adjoining ends in any suitable and readily providable manner.

At this point, the material is in the form of a simple hoop (without its splines) which has the correct axial dimension, but which is substantially greater in diameter than the desired diameter of the finished shell. This hoop is then rotated between a mating pair of corrugating wheels. These wheels resemble a loosely fitting gear set. The size and spacing of the teeth in these wheels are such that they form the sheet material of the hoop into the desired corrugated shape shown.

An alternate method of forming the shell is to extrude a tube of the desired shape. The extrusion would be formed by forcing molten or otherwise plasticized metal through forming dies of the appropriate shape to create a tube with a spline shaped inner diameter and of the desired wall thickness. This tube, of arbitrary length, would then be cut into pieces of the desired axial length.

While the splines 22 can be provided in shell 12, either before or after the shell is formed from the sheet material, the tabs themselves in this particular embodiment can only be made after formation of the splines. The way this is accomplished is best illustrated in FIG. 2. As seen there, one of the tabs 28, which for clarity will be referred to as tab 28a, is viewed from above, while a somewhat diametrically opposite tab 28b is viewed from its underside. Note in particular that tab 28a extends all the way across from one spline 22, not to the next spline which will be labeled 22a, but the spline 22 thereafter such that a spline 22a is disposed adjacent to and made shorter axially by tab 28a. This is because the tab 28a is formed using an end segment of spline 22a. In particular, before the tab 28a is ever formed, but after the spline 22a is formed, a slit 52 is made into the strut a short distance from its end, as shown in FIG. 2. Once the slit is made, a suitable deforming device, for example a punch or striker is used to push the segment of strut 22a between the slit and the end of the shell radially inward such that it forms the tab. This radially inward deformation best illustrated by tab 28b allows the tab to project radially inward beyond the innermost bearing surface 24. All of the tabs 26 and 28 are formed in this manner in the embodiment disclosed. Moreover, while the present embodiment discloses splines 26 and 28 being axially aligned, that is, using the same splines to form them, it is to be understood that the present embodiment is not limited to the axial alignment of tabs. Indeed, one-way drive device 10 is not limited to this particular way of forming the tabs themselves, although it is a relatively simple, uncomplicated, and economical way of doing so. They could be provided by welding or soldering in place a separate, small block of material. Further, while the shell 10 is shown including twelve tabs 26 and twelve tabs 28, the one-way drive device is not limited to that number of tabs. The number will vary from device to device, depending upon the dimensions of the device, the material being used and its application, and possibly other factors that may be readily determined by those with skill in the art.

Turning now to the pocket plate 30, the notch plate 40, and the end washer 50, attention is directed to the way in which they are provided. In each case, in the embodiment illustrated, each of these latter components is integrally stamp formed from a sheet of metal or other suitable material. In the case of the pocket plate, its splines 34 are simultaneously stamp formed into its outer periphery or formed by means of partial piercing and its pockets 32 are formed by means of partial piercing. In the case of the notch plate 40, its oil flow channels 45 and its inner splines 46 can be stamp formed with the rest of the plate. Its notches 36, however, are formed by means of partial piercing in the same manner as the pockets in the pocket plate. This partial piercing process is described in co-pending U.S. application Ser. No. 11/455,320, filed Jun. 19, 2006, entitled ONE-WAY DRIVE DEVICE AND METHOD OF MAKING THE SAME and assigned to the assignee of the present application. Finally, the end washer 50 can be readily stamp formed along with its outer splines 52.

While the methods of forming the pocket and notch plates and the washer, as described immediately above is a preferred way of making these components, device 10 is not limited to components formed in that way.

Clearly, the pocket plate assembly, notch plate assembly, and end washer can be formed and provided in any particular order as long as they are all available when the one-way drive device is to be assembled. This is also true of the shell, with one exception that should be apparent from the foregoing discussions. Clearly, the shell has to be made with the splines and preferably with one of the sets of tabs in place, for example, tabs 26, so that the pocket plate assembly, notch plate assembly, and end washer can be inserted into the shell in the manner described previously from the other end of the shell, that is, the end ultimately including tabs 28. Once the pocket plate assembly, notch plate assembly, and end washer are assembled in the shell, the tabs 28 can be formed locking everything in place.

Once the one-way drive device 10 is assembled in the manner just described, it can be readily connected to drive and driven members (not shown) in a conventional manner, for example, as described in the '978 patent. In particular, the pocket plate 30 can be connected with a drive member such that the pocket plate, shell and end washer rotate as a single unit in either a clockwise or counter-clockwise direction. When the pocket plate is caused to rotate in one direction, it is allowed to rotate freely relative to the notch plate, that is, in the overrunning direction. This is because in that direction none of the struts engage and lock into any of the notches in the notch plate. However, when the pocket plate is rotated in the opposite direction, at least one of the struts will eventually lock into engagement with a cooperating notch causing the notch plate to rotate with the pocket plate or if the notch plate is locked in place it will prevent the pocket plate from rotating in that direction. This particular way in which the one-way drive device operates is not new. For a more detailed description of this type of one-way drive device operation reference is again made to the '978 patent.

Returning to FIG. 1, an additional point should be made here. The one-way drive device described in conjunction with FIG. 1 calls for the pocket plate assembly 29 being interlocked for movement with the shell 12. It is to be understood that the pocket plate assembly and the notch plate assembly could readily reverse roles in this regard. That is, the notch plate assembly 39 could easily be provided with outermost splines and dimensioned to interlock with shell 12 adjacent tabs 26 while the pocket plated of the pocket plate assembly could be provided slightly radially smaller dimensionally and provided with, for example, oil flow channels. In this latter case, the pocket plate assembly would then be positioned between the notch plate assembly and the washer.

What is claimed is:

1. In a method of making a one-way drive device including a pocket plate assembly having a disk-shaped pocket plate and a notch plate assembly having a disk-shaped notch plate, the improvement comprising:
  (a) forming an axially extending open ended cylindrical shell adapted to contain therein said pocket and notch plate assemblies, said shell having opposite first and second axial ends and opposing inner and outer circumferential surfaces which extend axially between said ends and which together are configured to include a plurality of circumferentially spaced and axially extending radially inward and outward projecting shell splines having radially innermost surface edges which together define an innermost annular bearing surface of the shell;
  (b) forming a first set of tabs adjacent the first axial end of the shell and extending radially inward beyond said innermost annular bearing surface;
  (c) providing said pocket plate assembly and said notch plate assembly and locating both assemblies within said shell through the second end of the shell such that one of the plate assemblies interlocks with said shell splines and such that the other assembly interlocks with the one assembly so that the two assemblies operate as a one-way drive device;
(d) providing a disk-shaped washer and locating said washer within said shell through the second end of the shell such that the other plate assembly is positioned between the one plate assembly and said washer; and
(e) thereafter forming a second set of tabs adjacent the second axial end of the shell and extending radially inward beyond said innermost annular bearing surface such that both plate assemblies are maintained in a cooperating axial relationship within said shell between said first and second set of tabs.

2. The improvement according to claim 1 wherein the step of forming said shell includes forming said shell splines so as to extend axially from the first end of the shell to the second end of the shell, except where said first and second sets of tabs are located.

3. The improvement according to claim 1 wherein the step of forming said shell includes
(a) providing a single sheet of metal having end edges; and
(b) rolling the single sheet into a cylinder and fixedly attaching the end edges together.

4. The improvement according to claim 3 wherein said step of forming said shell includes integrally forming said shell splines in said single sheet either before or after it is rolled into said cylinder.

5. The improvement according to claim 4 wherein said step of forming said shell includes integrally forming said tabs from said splines.

6. The improvement according to claim 5 wherein said step of forming each of said tabs includes selecting a segment of a corresponding one of said shell splines, forming a slit in the corresponding segment and causing the segment to be deformed radially inward relative to the one spline such that the radially inwardly deformed segment serves as the tab.

7. The improvement according to claim 1 wherein said steps of providing said disk-shaped pocket and notch plates and said washer plate include the steps of stamp forming said plates and said washer from sheet metal.

* * * * *